United States Patent
Stura et al.

(10) Patent No.: US 7,610,037 B2
(45) Date of Patent: Oct. 27, 2009

(54) CHARGING IN COMMUNICATION NETWORKS

(75) Inventors: Marco Stura, Espoo (FI); Gabor Bajko, Budapest (HU)

(73) Assignee: Nokia Corporation, Espoo (FI)

(*) Notice: Subject to any disclaimer, the term of this patent is extended or adjusted under 35 U.S.C. 154(b) by 254 days.

(21) Appl. No.: 10/625,909

(22) Filed: Jul. 24, 2003

(65) Prior Publication Data

US 2004/0229596 A1 Nov. 18, 2004

(30) Foreign Application Priority Data

May 13, 2003 (GB) ................... 0311004.6

(51) Int. Cl.
*H04M 11/00* (2006.01)
(52) U.S. Cl. ................... 455/406; 455/405; 379/114.1
(58) Field of Classification Search ......... 455/405–409, 455/414.1–417, 454, 426.1, 432.1, 432.2, 455/517, 552.1; 379/142.08, 215.01, 201.01, 379/114.01, 114.1; 709/227, 204; 370/400, 370/389, 352
See application file for complete search history.

(56) References Cited

U.S. PATENT DOCUMENTS

| | | | | |
|---|---|---|---|---|
| 5,752,185 A * | 5/1998 | Ahuja | ................... | 455/414.1 |
| 6,597,779 B1 * | 7/2003 | Wilk et al. | ............. | 379/210.01 |
| 2002/0068545 A1 * | 6/2002 | Oyama et al. | ............... | 455/406 |
| 2002/0102970 A1 * | 8/2002 | Moon | ................... | 455/414 |
| 2002/0176559 A1 * | 11/2002 | Adamek et al. | ........ | 379/215.01 |
| 2002/0191597 A1 * | 12/2002 | Lundstrom | ............... | 370/356 |
| 2004/0022233 A1 * | 2/2004 | Gemmer | ................... | 370/352 |

FOREIGN PATENT DOCUMENTS

| | | |
|---|---|---|
| JP | 2000-332750 | 11/2000 |
| JP | 2002-522965 | 7/2002 |
| WO | WO 01/91446 A2 | 11/2001 |
| WO | WO02/34003 * | 4/2002 |
| WO | WO 02/34003 A1 * | 4/2002 |
| WO | WO 02/052833 A2 | 7/2002 |
| WO | WO 03/026318 A2 | 3/2003 |

OTHER PUBLICATIONS

Henrikson, E. "Private SIP Extension for Mobile Charging Information draft-henrikson-sip-charging-infromation-03" May 2002, IETF Internet Draft, XP-002292317; pp. 1-10.

(Continued)

*Primary Examiner*—Patrick N Edouard
*Assistant Examiner*—Justin Y Lee
(74) *Attorney, Agent, or Firm*—Mintz, Levin, Cohn, Ferris, Glovsky and Popeo, P.C.

(57) ABSTRACT

This invention relates to a method for supporting a communication session of an user equipment, by means of a communication system that includes at least one entity between the user equipment and a node with which the user equipment is arranged to establish a session, the method including the steps of establishing a session between the user equipment and the node via the at least one entity, putting the session on hold, reserving resources for the session while the session is on hold, and resuming the session and distributing charging information.

36 Claims, 3 Drawing Sheets

OTHER PUBLICATIONS

"3GPP TS 24.228 V5.0.0—Signaling flows for the IP multimedia call control based on SIP and SDP—Stage 3"; Mar. 2002, XP-002265154; pp. 1-106.

"ETSI TS 124 229 V5.4.0—Digital cellular telecommunications system (Phase 2+); Universal Mobile Telecommunications System (UMTS); IP Multimedia Call Control Protocol based on SIP and SDP; Stage 3"; Global System For Mobile Communications; Mar. 2003; pp. 1-245.

Japanese Office Action dated Jun. 3, 2009, issued in connection with counterpart Japanese Patent Application No. JP 2006-530637.

* cited by examiner

CHARGING IN COMMUNICATION NETWORKS

BACKGROUND OF THE INVENTION

1. Field of the Invention

The present specification relates generally to charging in communication networks. The present specification also relates generally, but not exclusively, to third generation (Universal Mobile Telecommunication System UMTS) networks.

2. Description of the Related Art

A communication system generally refers to a facility that enables communication between two or more entities such as user terminal equipment and/or network entities and other nodes associated with a communication system. The communication may comprise, for example, communication of voice, electronic mail (email), text messages, data, multimedia and so on.

The communication may be provided by a fixed line and/or wireless communication interfaces. A feature of some wireless communication systems is that they provide mobility for the users thereof. An example of communication systems providing wireless communication is a public land mobile network (PLMN). An example of the fixed line system is a public switched telephone network (PSTN).

A communication system typically operates in accordance with a given standard or specification which sets out what the various elements of a system are permitted to do and how that should be achieved. For example, the standard or specification may define if the user, or more precisely user equipment, is provided with a circuit switched server or a packet switched server or both. Communication protocols and/or parameters which are preferably used for the connection are also typically defined. For example, the manner of how communication shall be implemented between the user equipment and the elements of the communication networks is typically based on a predefined communication protocol. In other words, a specific set of "rules" on which the communication may be based on is preferably defined to enable the user equipment to communicate via the communication system.

The introduction of Third Generation (3G) communication systems will, in all likelihood, significantly increase the possibilities for accessing services on the Internet via mobile user equipment (UE) as well as other types of UE.

Various user equipment (UE) such as computers (fixed or portable), mobile telephones, personal data assistants or organisers and so on are known to the skilled person and can be used to access the Internet to obtain services. Mobile user equipment, typically referred to as a mobile station (MS), can be defined as a means that is capable of communication via a wireless interface with another device such as a base station of a mobile telecommunication network or any other station.

The term "service" used above and hereinafter will generally be understood to broadly cover any service or goods which a user may desire, require or be provided with. The term also will generally be understood to cover the provision of complimentary services. In particular, but not exclusively, the term "service" will be understood to include Internet protocol multimedia IM services, conferencing, telephony, gaming, rich call, presence, e-commerce and messaging, for example, instant messaging.

The 3G Partnership Project (3GPP) is defining a reference architecture for the Universal Mobile Telecommunication System (UMTS) core network which will, in all likelihood, provide the users of user equipment (UE) with access to these services. This UMTS core network is divided into three principal domains. These are the Circuit Switched domain, the Packet Switched domain and the Internet Protocol Multimedia (IM) domain.

The latter of these, the IM domain, typically makes sure that multimedia services are adequately managed. The IM domain typically supports the Session Initiation Protocol (SIP) as developed by the Internet Engineering Task Force (IETF).

SIP is an application layer signaling protocol for starting, changing and ending user sessions as well as for sending and receiving transactions. A session may, for example, be a two-way telephone call or multi-way conference session or connection between a user and an application server (AS). The establishment of these sessions generally enables a user to be provided with the above-mentioned services. One of the most commonly included features of SIP is that the protocol typically enables personal mobility of a user using mobile UE by providing the capability to reach a called party (which can be an application server AS) or another user equipment via a single location independent address.

A user connected to SIP based communication system may generally communicate with various entities of the communication system based on standardized SIP messages. SIP is typically defined in an Internet Engineering Task Force (IETF) protocol specification by G Rosenberg et al., titled: "SIP: session initiation protocol" RFC 3261, June 2002. This document is herein incorporated by reference in its entirety.

One version of the third generation standard is "release 5" or "rel5". This introduces the IP multimedia core network subsystem that has been developed to use SIP technology as a basis for all IP services such as voice over IP, amongst others. The SIP standard is a rendezvous protocol which typically may be used to establish media sessions between a SIP user agent client (UAC) and a SIP user agent server (UAC). To open a session, SIP generally uses the SDP (session description protocol) protocol and it is thus possible to establish a variety of sessions, depending on the used application both for real time services and non real time services. The SIP is generally a flexible protocol that can be used to establish different type of sessions. For example, some sessions may require a certain precondition to be satisfied. Other sessions may require reliable provisional responses. Other sessions may require confirmation of reserved resources. It is also possible to have a variable number of SDP offer/answer exchanges.

In order to enable charging correlation at the media component level for charging events related to the same SIP session and generated in different domains (i.e. access network and IM subsystem (IMS) network) for the same SIP session, the access network charging identifier identifying the resource reservation carrying a particular media flow (e.g. in GPRS (general packet radio service) access the GPRS Charging Identifier and GGSN (gateway GPRS support node) address) is preferably to be sent and distributed in the IMS network. This access charging identifier is typically sent to P-CSCF(PDF) (proxy call session control function and policy decision function respectively) via the Go interface and distributed in IMS in a SIP "UPDATE" message. With the next version which has been proposed for the 3GPP standard, "release 6" or "rel6" it is possible that for some session set up scenarios an UPDATE message is not sent at all. This generally results in the problem that the network is unable to distribute the charging identifier between the network elements that require this information.

In the current proposals for release 5, the UPDATE request is typically sent from the user equipment to the P-CSCF. A confirmation of the preconditions are commonly requested in a response when the user equipment finishes a quality of service reservation for both the up link and down link directions. The calling party generally sends the UPDATE request to the terminating end point via the signaling path established by the INVITE request. The UPDATE request frequently includes in the SDP, the information about the successful quality of service bi-directional mode, due to the successful bi-directional PDP context established. The SDP generally indicates that the quality of service resource reservation for both send and receive mode was successful from the terminating end point side.

With the proposals for release 6, for example, it is possible that a session can be established by a simple SIP INVITE/200 OK transaction or it is possible that the end points involved in the session set up will not make use of preconditions or not ask for confirmation of reserved resources. In all of these cases, the UPDATE message will typically not be sent and thus distribution of the charging identity is generally not possible.

SUMMARY OF THE INVENTION

It is an aim of certain embodiments of the present invention to address the problems discussed previously.

According to a first embodiment of the present invention, there is provided a method for supporting a communication session of an user equipment, by means of a communication system that includes at least one entity between the user equipment and a node with which the user equipment is arranged to establish a session. The method typically includes the step of establishing a session between the user equipment and the node via the at least one entity, putting the session on hold, reserving resources for the session while the session is on hold, and resuming the session and distributing charging information.

According to a second embodiment of the invention, there is provided a method for supporting a communication session of an user equipment, by means of a communication system that includes at least one entity between the user equipment and a node with which the user equipment is arranged to establish a session. The method typically includes the step of modifying an existing session between the user equipment and the node via the at least one entity, putting the session on hold, reserving resources for the modified session while the session is on hold, and resuming the session and distributing charging information.

According to another embodiment of the invention, there is provided a communication system for supporting a communication session of an user equipment, the system typically including at least one entity between the user equipment and a node with which the user equipment is arranged to establish a session, the system typically being arranged to establish a session between the user equipment and the node via the at least one entity, at least one of the node and the user equipment being arranged to put the session on hold, at least one of the node and the user equipment being arranged to reserving resources for the session while the session is on hold, at least one of the node and the user equipment being arranged to resume the session; and at least one entity is typically arranged to distribute charging information.

According to another embodiment, there is provided a communication system for supporting a communication session of an user equipment, the system typically including at least one entity between the user equipment and a node with which the user equipment is arranged to establish a session, the system generally being arranged to modify a session between the user equipment and the node via the at least one entity, at least one of the node and the user equipment often being arranged to put the session on hold, at least one of the node and the user equipment being arranged to reserving resources for the modified session while the session is on hold, at least one of the node and the user equipment typically being arranged to resume the session and at least one entity is commonly arranged to distribute charging information.

BRIEF DESCRIPTION OF THE DRAWINGS

For a better understanding of certain embodiments of the present invention and as to how these embodiments may be carried into effect, reference will now be made to the accompanying drawings in which.

DETAILED DESCRIPTION OF THE PREFERRED EMBODIMENT(S)

In this document, SIP messages are indicated in capitals.

Certain embodiments of the present invention are particularly applicable to the release 6 version of 3GPP which will typically allow the terminals, in other words, the user equipment, to decide for themselves how to use SIP for communication purposes. It should be appreciated that certain embodiments of the present invention may be applicable to any other version of the 3GPP standard or indeed any other standard.

Certain embodiments of the present invention are arranged to define a mechanism which works with the existing SIP specifications to ensure the proper working of the charging correlation mechanism in any scenario where no precondition is used or UPDATE is only used to modify the already set up session. In other words, if an UPDATE request is not used in the session setup phase before the dialog is confirmed, in other words, final response received to the request, certain embodiments of the present invention may be used.

Figure 1:
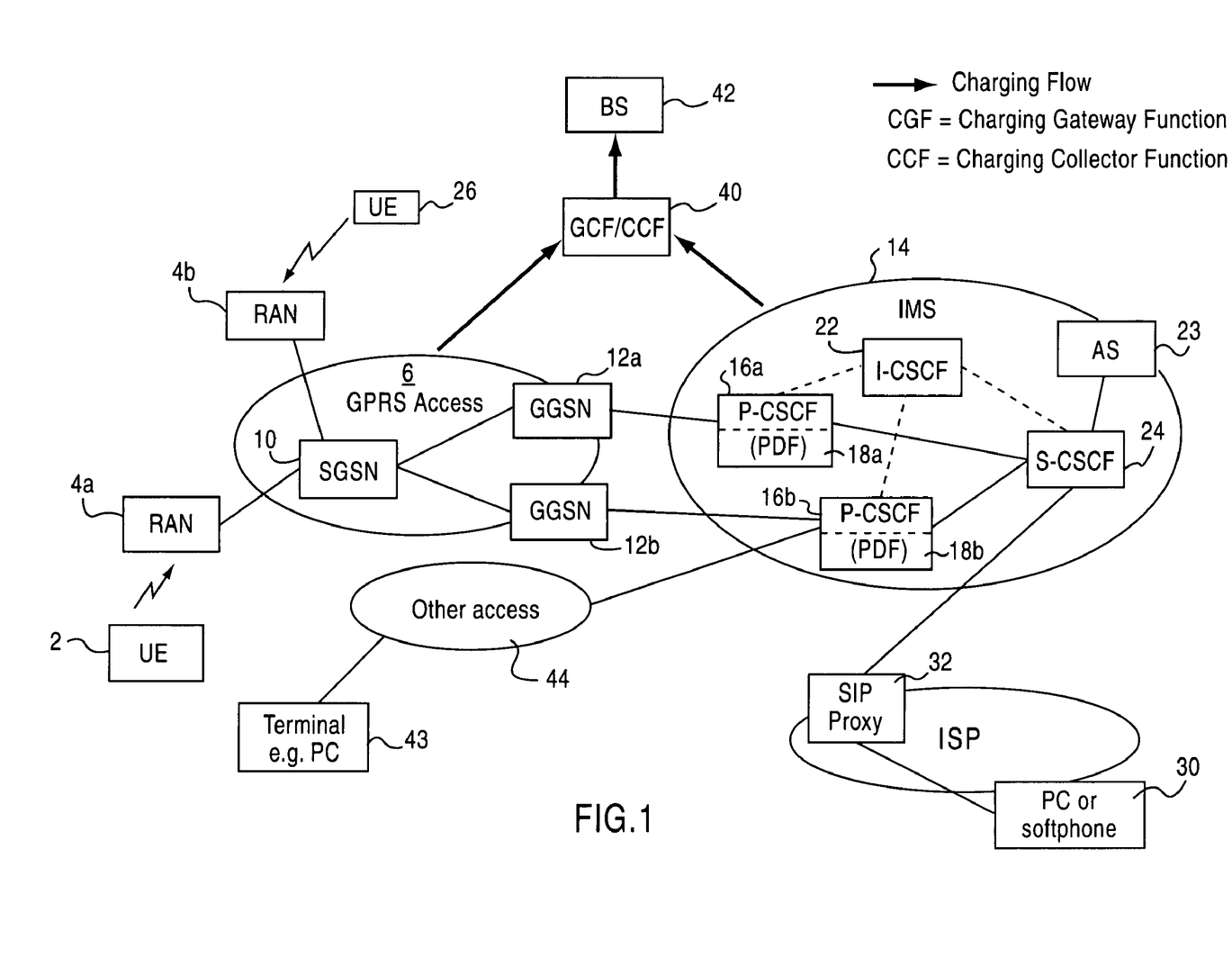
FIG. 1 shows a schematic system in which certain embodiments of the present invention may be implemented.

Reference is made to FIG. 1 which shows schematically a system in which certain embodiments of the present invention may be implemented. The system typically includes user equipment 2. The user equipment 2 may take any suitable form and may, for example, be a mobile or fixed entity such as a mobile telephone, personal digital assistant (PDA), portable computer, laptop computer, fixed computer or any other suitable device. The user equipment 2 is typically arranged to communication with a first radio access network (RAN) 4a via a wireless connection. This wireless connection may be at any suitable frequency, such as, for example, a radio frequency.

The first radio access network 4a generally includes a base station entity (sometimes referred to as node B). For the purpose of this document, the term base station will be used and is intended to cover any suitable entity. The radio access network 4 also typically includes a control element. Depending on the standard, the control element may be referred to as a radio network controller (RNC) in the case of a UMTS system or a base station controller (BSC) in the case of a GSM system. It is intended that the term controller cover any such control entity. In some arrangements, the control function is provided separately from the base station function and a single control entity may control a number of base stations. In other embodiments of the present invention, each base station may incorporate part of the control function.

The radio access network is typically arranged to communicate with a core network 6. The core network 6 illustrated in FIG. 1 is a packet switched core network. The first radio access network 4 is generally connected to a serving GPRS (general packet radio service) support node SGSN 10. The SGSN 10 is commonly used to switch the packet switched transactions.

The SGSN 10 is typically connected to first and second gateway GPRS support nodes GGSN 12a and b. These are generally switches at the point where the core network 6 is connected to external packet switched networks. Incoming and outgoing packet switched connections generally will go through a GGSN. In the arrangement shown in FIG. 1, the GGSNs 12a and b are shown as being connected to an IM (IP multi-media) subsystem 14. Each GGSN 12 is typically connected to a P-CSCF 16a and b (proxy call session control function) respectively. Each P-CSCF 16a and b generally has a PDF (policy decision function). PDF is commonly part of the service based local policy (SBLP) architecture of the IP multimedia subsystem. The policy decision function generally is a logical policy decision element which typically uses IP mechanisms to implement service based local policy in the IP bearer layer. The PDF generally makes decisions in regard to SBLP using policy rules and commonly communicates those decisions to the GGSN, which is typically the IP policy enforcement point (PEP). In the arrangement shown in FIG. 1, the PDFs 18a and b respectively are shown as being a logical entity of the respective P-CSCF. However, it should be appreciated that in alternative embodiments of the present invention, the PDF may be a separate entity or incorporated in any other suitable entity.

The P-CSCF 16a and b are generally connected to an interrogating(I)-CSCF 22. The I-CSCF 22 is typically arranged to determine the appropriate serving-CSCF (S) 24 for the end user, that is, the called party.

FIG. 1 also shows an application server AS 23 in the IM network. The GCID may be distributed to the AS in some embodiments of the invention.

Also shown in FIG. 1 is a user 30 which typically does not operate in accordance with the third generation standard and, for example, may use the SIP protocol. The user 30 is generally connected to a SIP proxy 32 which commonly enables the user agent client to obtain services via the IM subsystem 14. The SIP proxy 32 is typically connected to the S-CSCF 24. The SIP proxy may be part of an ISP core. The user may be user equipment such as a PC, softphone or the like.

In certain embodiments of the invention, the core network 6 and the IMS system 14 may be connected to a CGF (Charging Gateway Function) 40 which generally includes a charging collector function CCF. The CCF alternatively may be a separate entity. The CGF 40 is commonly connected to a billing system 42. The billing system is typically part of the operator's network. Likewise the CGF is usually part of the operator's network. The CGF and/or the billing system often use a common charging identifier that is typically generated in the network (access and IMS) to correlate charging information which then commonly determines how much a user is billed for a given session. It should be appreciated that, in alternative embodiments of the invention, any other suitable billing mechanism may be used.

Also shown in FIG. 1 is a second user equipment 26 which is generally connected to a second RAN 4b. It should be appreciated that this is for illustrative purposes and in practice each RAN may be arranged to communicate with a relatively large number of user equipment. The second RAN 4b is often connected to the SGSN 10.

Also shown in FIG. 1 is a terminal 43 such as a PC or the like which is commonly arranged to be connected to the second P-CSCF 18b via another access network 44 which may be in accord with any suitable access technology.

In certain embodiments of the present invention, the SIP user agent client UAC is the calling party which at least in the two examples shown may be the user equipment 2 and the user equipment 30. The SIP user agent server UAS is commonly the called party which, at least in the examples shown, may be the user equipment 26 and the user equipment 2. It should be appreciated that this is by way of example only and any of the terminals or user equipment may be the called party and the calling party, respectively.

In certain embodiments of the invention, the GCID (GPRS charging identifier) is typically sent from the GGSN to the PDF functionality. If the PDF functionality is separate from the P-CSCF, the GCID may also be sent to the P-CSCF. The messages may be sent over the Go interface, that is generally the interface between the GGSN and the P-CSCF, typically using COPS (Common Open Policy Service) protocol messages. COPS is generally the protocol used for the Go interface. The GCID is often distributed in SIP signaling to other IMS functions such as, but not limited to, the S-CSCF, the application server and the I-CSCF.

The GCID is commonly generated by the GGSN for a GPRS PDP context. There is typically a one to one relationship between the GCID and the PDP context. If GPRS is generally used to access the IMS, the GCID is used together with the GGSN address as the access part of the charging correlation vector that typically includes an access part and an IMS part, which is generally the IMS charging identifier. The charging vector is described in more detail hereinafter.

It should be appreciated that embodiments of the present invention may be used with access technologies other than GPRS. For example, certain embodiments of the invention are particularly applicable where the PDF function and the Go interface are used, that is where SBLP is commonly used at least for charging correlation.

If the terminal, in other words, the user equipment, does not use preconditions or 100 REL (SIP preconditions) then it is not possible to distribute the GCID. In this scenario, the terminal will typically put the session on hold during the first SDP (session description protocol) offer/answer exchange. After reserving the resources for the session, the terminal will generally resume the session with a re-INVITE message which may then distribute the GCID from the P-CSCF to other IMS functions. The GCID is commonly included in a P-charging-vector, which is described in more detail hereinafter. In particular, the P-CSCF will often put the GCID information into the P-charging-vector header in the re-INVITE request which typically resumes the media previously put on hold.

In the alternative, if the terminal modifies the existing session by adding a media component or changing the previously used codec, there is generally no opportunity to carry the GCID to the S-CSCF or other functions in the IMS. Thus, in this case and according to certain embodiments of the present invention, the terminal typically puts the new media on hold and generally resumes the media with a re-INVITE message once the resources have been successfully reserved. The re-INVITE message thus often distributes the GCID in the IMS network.

Certain embodiments of the present invention may be used in IMS network with whatever access network is used. According to many of these embodiments, the Go interface is implemented at least for charging correlation.

Figure 2:
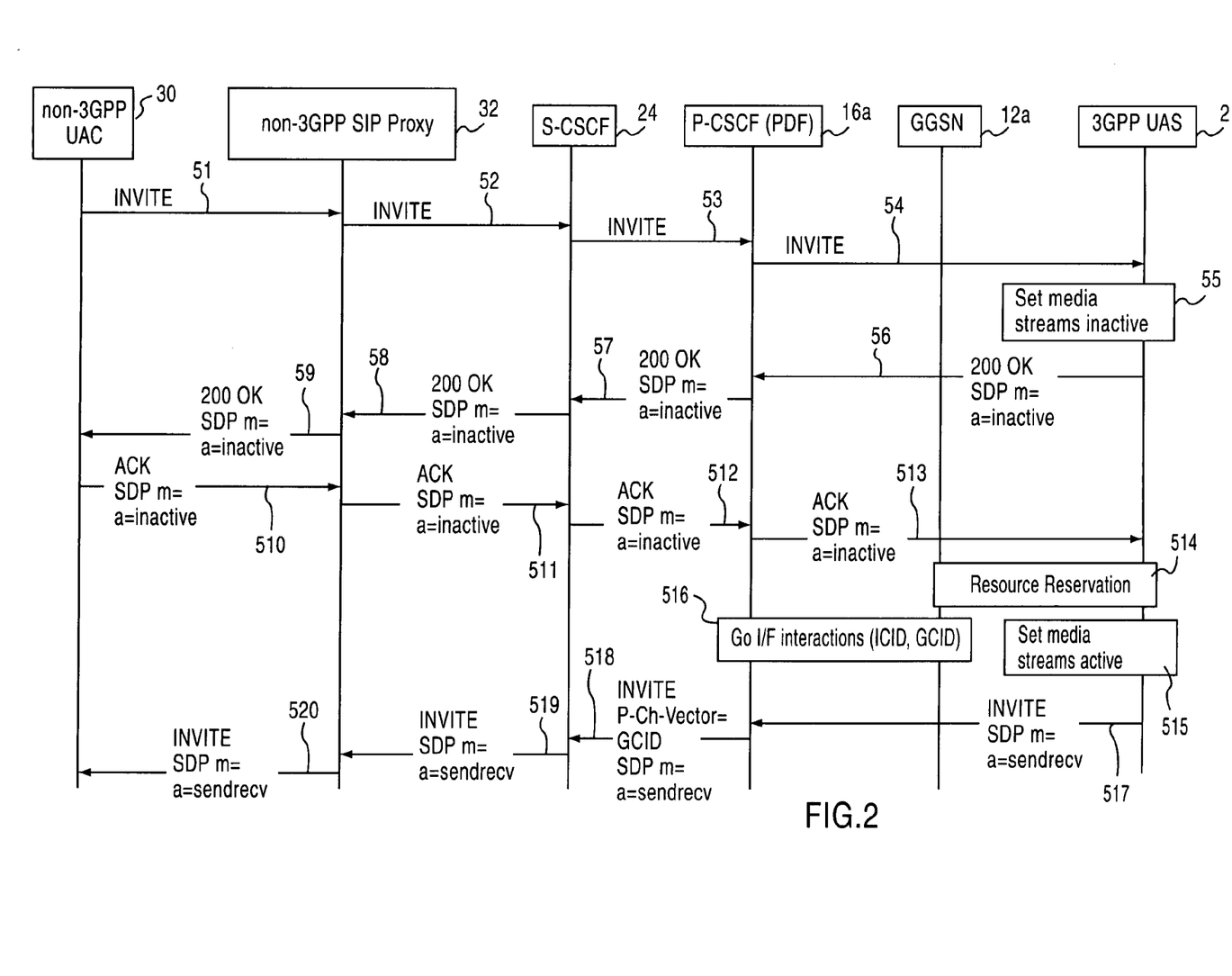
FIG. 2 shows the signal flow in a first embodiment of the invention.

Reference is now made to FIG. 2 which shows the signaling commonly used in a first embodiment of the present invention. Those elements which are the same as or analogous to those shown in FIG. 1 are referred to using the same reference numbers. It should be appreciated that some elements, for example the I-CSCF, which would generally be present in practice have been omitted for clarity. This embodiment of the invention shows an example where the calling party is a non third generation entity.

In step S1, the UAC or user equipment 30 commonly sends an INVITE message to a non-3GPP SIP proxy 32. The SIP proxy 32 generally sends the INVITE message in step S2 to the S-CSCF 24. The S-CSCF 24 typically sends the INVITE message in step S3 to the first P-CSCF 16a, and more specifically, according to certain embodiments, to do PDF function thereof. The first P-CSCF 16a generally forwards the INVITE message in step S4 to the user agent server or user equipment 2. The user agent server 2 typically causes the media streams to be inactive in step S5.

The user agent server 2 generally sends a message to the first P-CSCF 16a in step S6 may be a 200 OK message and commonly indicates in the SDP that the session is inactive. This message is typically forwarded by the first P-CSCF 16a to the S-CSCF 24 in step S7. In step S8, the message is generally forwarded by the S-CSCF 24 to the SIP proxy 32. In step S9, the message is commonly forwarded by the SIP proxy 32 to the user agent client 30.

In step S10, the user agent client 30 typically sends an acknowledgement ACK that it has received the message. This acknowledgement commonly includes the SDP indicating inactive session. This is generally sent to the SIP proxy 32. In step S11, the SIP proxy 32 typically forwards the message to the S-CSCF 24. This message may be forwarded in turn by the S-CSCF 24 to the first P-CSCF 16a in step S12. In S13, the messages may be forwarded by the first P-CSCF 16a to the user agent server 2. In step S14, the user agent server 2, in conjunction with first GGSN 12a, typically reserve resources. In step S15, once the resources have been reserved, the media streams may be set to be active by the user agent server 2. Step S15 may take place at the same time as step S16. In step S16, there may be interactions between the GGSN 12a and P-CSCF 16a via the Go interface. In this step ICID (IMS Charging Identifier) and GCID information may be exchanged. The ICID may be used for session level correlation while the GCID typically is used for media component level correlation. GCID identifies the access charging information related to a particular media component assuming that session/media are not multiplexed in the same PDP Context (3GPP Rel 5).

In step S17, the user agent server 26 may send a re-INVITE message with the SDP indicating active session, in other words, the medias attributes may be set to sendrecv. a=sendrecv for all the medias that need to be active in the session. This message is typically forwarded by the first P-CSCF 16a to the S-CSCF 24. However, the first P-CSCF 16a may also include the P-charging vector with the GCID information. The S-CSCF 24 generally forwards the INVITE message (with or without the P-charging vector) in step S19. In step S20, the message is commonly sent from the SIP proxy 32 to the UAC 30.

Figure 3:
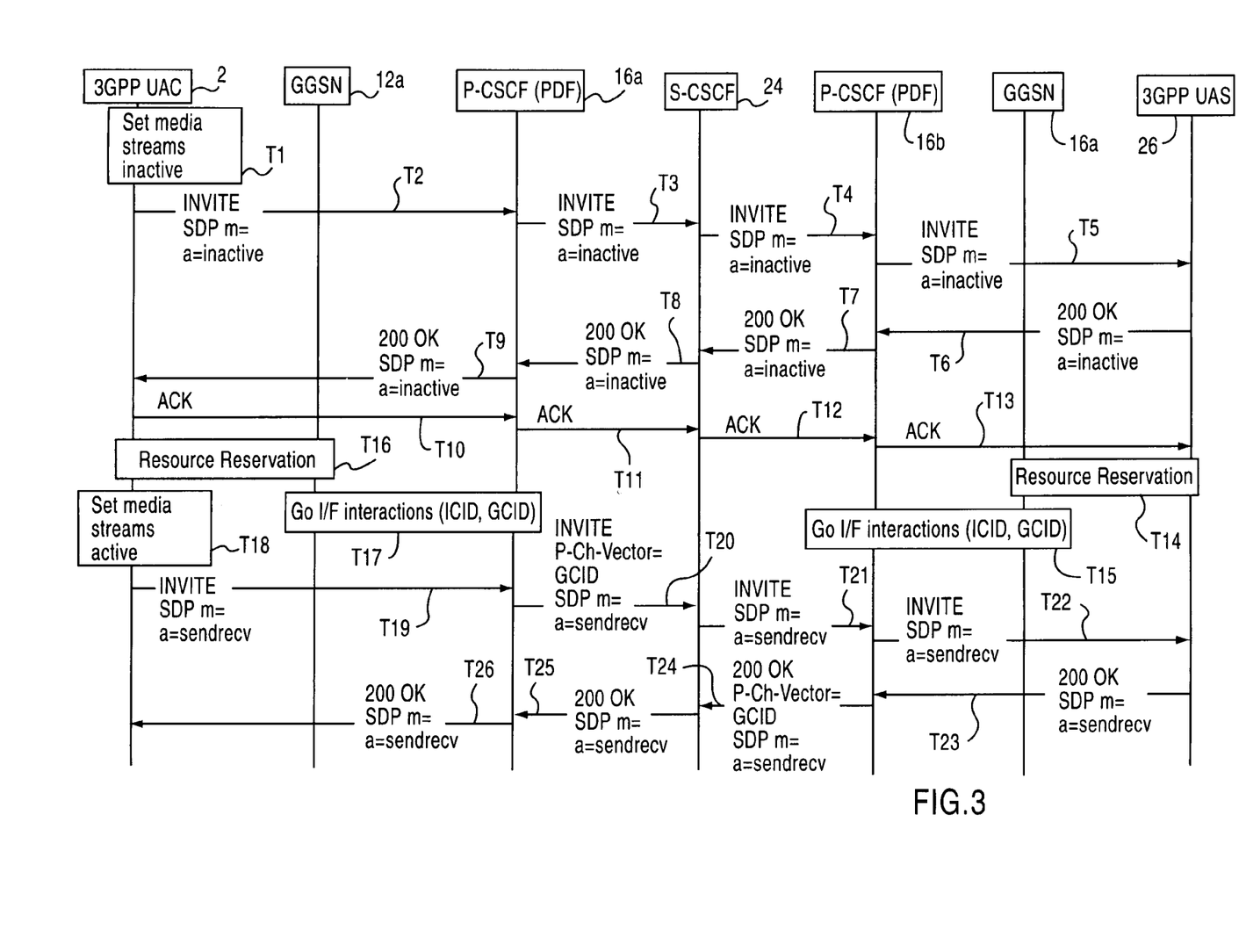
FIG. 3 shows the signal flow in a second embodiment of the invention.

Reference is made to FIG. 3 which shows a second embodiment of the present invention. This embodiment illustrates a representative signal flow for an example of a session established between 3GPP user agents without any preconditions. According to this embodiment, there is a first 3GPP user application client, which may be the user equipment 2. This is typically associated with the first GGSN 12a and the first P-CSCF 16a with a PDF functionality. The user application agent server or user equipment 26 is generally associated with the second GGSN 12b and a second P-SCSF 16b. The two P-CSCFs are often communicating via a common S-CSCF 24. However, in some embodiments of the present invention, more than one S-CSCF may be provided and indeed there are other entities which have been omitted for clarity.

In step T1, the user agent client 2 commonly sets the media streams to be inactive. In step T2, the user agent client 2 typically sends an INVITE message with SDP indicating the media streams are inactive to the first P-CSCF 16a. The first P-CSCF 16a generally forwards the message in step T3 to the S-CSCF 24. The S-CSCF 24 typically forwards the message in step T4 to the second P-CSCF 16b which, in turn, generally forwards that message in step T5 to the user agent server 26.

In step T6, the user agent server 26 commonly sends a 200 OK acknowledgment with the SDP indicating an inactive session to the second P-CSCF 16b. In step T7 the message is typically forwarded by the second P-CSCF 16b to the S-CSCF 24 which, in turn, generally forwards that message to the first P-CSCF 16a in step T8. The first P-CSCF 16a commonly forwards the message in step T9 to the user agent client 2.

In step T10, the user agent client 2 typically sends an acknowledgement message ACK to the first P-CSCF 16a. This acknowledgement is generally forwarded by the first P-CSCF 16a to the S-CSCF 24 in step T11 and by the S-CSCF 24 to the second P-CSCF 16b in step T12. The acknowledgment may be forwarded by the second P-CSCF 16b in step T13 to the user agent server 26.

In step T14, resource reservation is commonly carried out between the user agent server 26 and the second GGSN 12b. Step T16 may take place at the same time as step T14 and resources may be reserved between the user agent client 2 and the first GGSN 12a. In step T15, there is typically interaction between the second GGSN 12b and the second P-CSCF 16b on the Go interface involving the ICID and the GCID. This is often as described in relation to FIG. 2. Step T17 is generally similar to step T15 but between the first GGSN 12a and the first P-CSCF 16a. Steps T15 and T17 may take place at the same time. In step T18, the user agent client 2 typically sets the media streams to be active.

The user agent client 2 then usually sends an INVITE message with SDP indicating active media streams, (in other words, the medias attributes are typically set to sendrecv. a=sendrecv for all the medias that need to be active in the session) information in step T19 to the first P-CSCF 16a.

In step T20, the P-CSCF 16a commonly adds in the P-charging-vector including the GCID. In step T21, the INVITE message may be forwarded by the S-CSCF 24 to the second P-CSCF 16b which in turn generally forwards that message in step T22 to the user agent server 26. The user agent server 26 typically sends an acknowledgement message 200 OK with the SDP containing an a=sendrecv information. The second P-CSCF 16b normally sends a message in step T24 to the S-CSCF 24 along with the P-charging-vector with the GCID information. In step T25, the S-CSCF 24 usually forwards the message without the P-charging-vector, to the first P-CSCF 16a which, in turn, commonly forwards that message to the user agent client 2 in step T26.

In one alternative modification to the arrangement shown in the first embodiment, the initial INVITE messages (steps S1 to S4) may include SDP with a=sendrcv information, as in steps T1 to T5 of the second embodiment. Likewise, steps S10 to S13 may be modified in such a scenario to have the same form as shown in steps T10 to T13 of the second embodiment, that is, not to include the SDP information. Conversely, steps T1 to T5 may be modified so that the INVITE message does not include the SDP information as in steps S1 to S4 of the first embodiment. Likewise, the acknowledgement message sent in steps T10 to T13 may have the SDP media stream inactive information.

The table below shows representative P-charging-vector in more detail. This is defined in the 3GPP specification number TS 24.229 and TS 24.228 which is hereby incorporated in its entirety by reference.

```
access-network-charging-info = (gprs-charging-info / generic-param)
gprs-charging-info = ggsn *(SEMI pdp-info) [SEMI extension-param]
ggsn = "ggsn" EQUAL gen-value
pdp-info = pdp-sig SEMI gcid SEMI auth-token *(SEMI flow-id)
pdp-sig = "pdp-sig" EQUAL ("yes" / "no")
gcid = "gcid" EQUAL gen-value
auth-token = "auth-token" EQUAL gen-value
flow-id = "flow-id" EQUAL gen-value
extension-param = token [EQUAL (token | quoted-string)]
```

The P-charging-vector header field typically has the fields described in RFC 3455 of the IETF which is hereby incorporated in its entirety by reference.

The access network charging info parameter is usually an incidence of a generic parameter from the current charge parameter component of the P-charging-vector header. The access network charging info parameter normally includes alternative definitions for different access networks. In this example, GPRS may be the supported access network as indicated in the GPRS-charging-parameter. In other embodiments of the invention, other access networks may be supported. For GPRS there are generally the following components to track; GGSN address and one or more PDP contexts (PDP-info parameter), an associated GPRS charging identifier (GCID parameter), a media authorisation token (or-token parameter) and one or more flow identifiers (flow-id parameter) that typically identify associated m-lines within the SDP from the SIP signaling. These parameters are usually transferred from GGSN to the P-CSCF (PDF) over the Go interface.

It should be appreciated that embodiments of the present invention can be used for on-line charging or off-line charging.

It is noted herein that while the above described are exemplifying embodiments of the invention, there are several variations and modifications which may be made to the disclosed solution without departing from the scope of the present invention as defined in the appended claims.

We claim:

1. A method, comprising:
putting, in response to an invitation message, on hold a communication session between a user equipment associated with a first access network and a node of a communication system via a second network and at least one entity of said communication system between said user equipment and said node, the communication session established without preconditions to reserve resources for the communication session when the preconditions are not supported on the communication session between the user equipment and the node, the communication session established based on a session initiation protocol (SIP) and session data protocol (SDP);
reserving resources for said session while said session is on hold;
communicating a charging identifier from a node of said first access network to a first node of said second network; and
resuming, in response to sending another invitation message and when the resources have been reserved, said communication session with the another message indicating an active session from said user equipment by which said charging identifier for the first access network is forwarded from said first node of the second network to a second node of the second network, wherein the first access network is different from the second network.

2. The method as claimed in claim 1, further comprising:
determining if charging information is provided during establishment of said session and carrying out the putting of the session on hold to the resuming of said session only when it has been determined that the charging information has not been provided.

3. The method as claimed in claim 2, wherein the establishment of said session comprises using session initiation protocol for said session.

4. The method claim as claimed in claim 3, wherein the establishing of said session comprises establishing a session wherein said charging identifier is sent in an invite message.

5. The method as claimed in claim 2, wherein the establishment of said session comprises operating at least part of said communication system in accordance with universal mobile telecommunications system standard.

6. The method as claimed in claim 2, wherein the establishment of the session comprises establishing a session wherein said at least one entity comprises a gateway general packet radio service support node.

7. A method as claimed in claim 6, wherein the establishment of said session comprises establishing a session wherein said at least one entity comprises a proxy call session control function, and wherein said node of the first access network is a gateway general packet radio service node, and said first node of the second access network is a proxy call session control function.

8. The method as claimed in claim 7, wherein said communicating of the charging identifier from the gateway general radio packet service node to the proxy call session control function comprises including said charging identifier in a common open policy service message.

9. The method as claimed in claim 6, wherein the establishment of said session comprises establishing a session wherein said at least one entity comprises a policy decision function, and wherein said node of the first access network is a gateway general packet radio service node and said first node of the second network is a policy decision function.

10. The method as claimed in claim 9, wherein said communicating of the charging identifier from the gateway general radio packet service node to the policy decision function comprises including said charging identifier in a common open policy service message.

11. The method as claimed in claim 2, wherein the establishment of said session comprises establishing a session wherein said at least one entity comprises a proxy call session control function.

12. The method as claimed in claim 2, wherein the establishment of said session comprises establishing a session wherein said at least one entity comprises a policy decision function.

13. The method as claimed in claim 1, further comprising:
determining if charging information is provided during a modifying of said session and carrying out the putting of the session on hold to the resuming of said session only when it has been determined that the charging information has not been provided.

14. The method as claimed in claim 1, further comprising: configuring said charging identifier to comprise at least a general packet radio service charging identifier.

15. The method as claimed claim 1, wherein the forwarding of the charging identifier for the first access network comprises forwarding the charging identifier for the first access network provided in a charging vector.

16. The method as claimed in claim 15, wherein the forwarding of the charging identifier for the first access network comprises forwarding the charging identifier for the first access network in a charging vector, wherein said charging vector comprises a p-charging vector.

17. The method as claimed in claim 1, wherein said node of the communications system comprises a user agent server.

18. The method as claimed in claim 1, wherein said node of the communications system comprises user equipment.

19. A system, comprising:
a user equipment associated with a first access network, wherein the system is configured to support a communication session between said user equipment and a node of the system via a second network, the communication session established without preconditions to reserve resources for the communication session when the preconditions are not supported by at least one of the user equipment and the node,
wherein the system is configured to put, in response to an invitation message, the communication session on hold, reserve resources for said communication session while said communication session is on hold, communicate a charging identifier from a node of said first access network to a first node of said second network, and resume, when the resources have been reserved, said communication session with another invitation message indicating an active session from said user equipment by which said charging identifier is forwarded from said first node of the second network to a second node of the second network; and
wherein the first access network is different from the second network.

20. A system, comprising:
at least one entity means between user equipment associated with a first access network and a node with which the user equipment is configured to establish a session via a second network;
placement means for putting, in response to an invitation message, the session on hold, the session established without preconditions to reserve resources for the session when the preconditions are not supported on the session between the user equipment and the node, the session established based on a session initiation protocol (SIP) and session data protocol (SDP);
reserving means for reserving resources for said session while said session is on hold;
communicating means for communicating a charging identifier from a node of said first access network to first node of said second network; and
resuming means for resuming said session with another invitation message indicating an active session from said user equipment by which said charging identifier for the first access network is forwarded from said first node of said second network to a second node of the second network, wherein the first access network is different from the second network.

21. A method, comprising:
receiving at a first node of a second network from a node of a first access network a charging identifier for said first access network for a communication session put, in response to an invitation massage, on hold between a user equipment associated with said first access network and a node of a communication system via said second network, the communication session established without preconditions to reserve resources for the communication session when the preconditions are not supported on the communication session, the communication session established based on a session initiation protocol (SIP) and session data protocol (SDP); and
in response to receiving at said first node of said second network from said user equipment another invitation message from said user equipment indicating an active session, forwarding said another invitation message from said first node of the second network to a second node of the second access network together with said charging identifier for said first access network, wherein the first access network is different from the second network.

22. The method as claimed in claim 21, wherein said charging identifier comprises a general packet radio service charging identifier.

23. The method as claimed claim 21, wherein the forwarding of the charging identifier for the first access network comprises forwarding the charging identifier for the first access network provided in a charging vector.

24. The method as claimed in claim 23, wherein said charging vector comprises a p-charging vector.

25. The method as claimed in claim 21, wherein said node of the first access network is a gateway general packet radio service node, and said first node of the second access network is a proxy call session control function.

26. The method as claimed in claim 25, wherein said receiving of the charging identifier for said first access network from the gateway general radio packet service node at the proxy call session control function comprises receiving said charging identifier in a common open policy service message.

27. The method as claimed in claim 21, wherein said node of the first access network is a gateway general packet radio service node and said first node of the second network is a policy decision function.

28. The method as claimed in claim 27, wherein said receiving of the charging identifier for the first access network from the gateway general radio packet service node at the policy decision function comprises receiving said charging identifier in a common open policy service message.

29. The apparatus as claimed in claim 21, wherein said node of the first access network is a gateway general packet radio service node and said first node of the second network is a policy decision function.

30. The apparatus as claimed in claim 29, wherein said receiver is configured to receive said charging identifier for the first access network from the gateway general radio packet service node at the policy decision function in a common open policy service message.

31. An apparatus, comprising:
a receiver configured to receive at a first node of a second network from a node of a first access network a charging identifier for said first access network for a communication session put, in response to an invitation message, on hold between a user equipment associated with said first access network and a node of a communication system via said second network, the communication session established without preconditions to reserve resources for the communication session when the preconditions are not supported on the communication session, the communication session established based on a session initiation protocol (SIP) and session data protocol (SDP); and a forwarder, configured to, in response to receiving at said first node of said second network from said user equipment another invitation message from said user equipment indicating an active session, forwarding said another invitation message from said first node of the second network to a second node of the second access network together with said charging identifier for said first access network, wherein the first access network is different from the second network.

32. The apparatus as claimed in claim 31, wherein said charging identifier comprises a general packet radio service charging identifier.

33. The apparatus as claimed in claim 31, wherein the forwarder is configured to forward the charging identifier for the first access network in a charging vector.

34. The apparatus as claimed in claim 33, wherein said charging vector comprises a p-charging vector.

35. The apparatus as claimed in claim 31, wherein said node of the first access network is a gateway general packet radio service node, and said first node of the second access network is a proxy call session control function.

36. The apparatus as claimed in claim 35, wherein said receiver is configured to receive said charging identifier for said first access network from the gateway general radio packet service node at the proxy call session control function in a common open policy service message.

* * * * *